H. H. ROOF.
TILTING GATE.
APPLICATION FILED MAR. 15, 1912.
1,062,928.
Patented May 27, 1913.
2 SHEETS—SHEET 1.
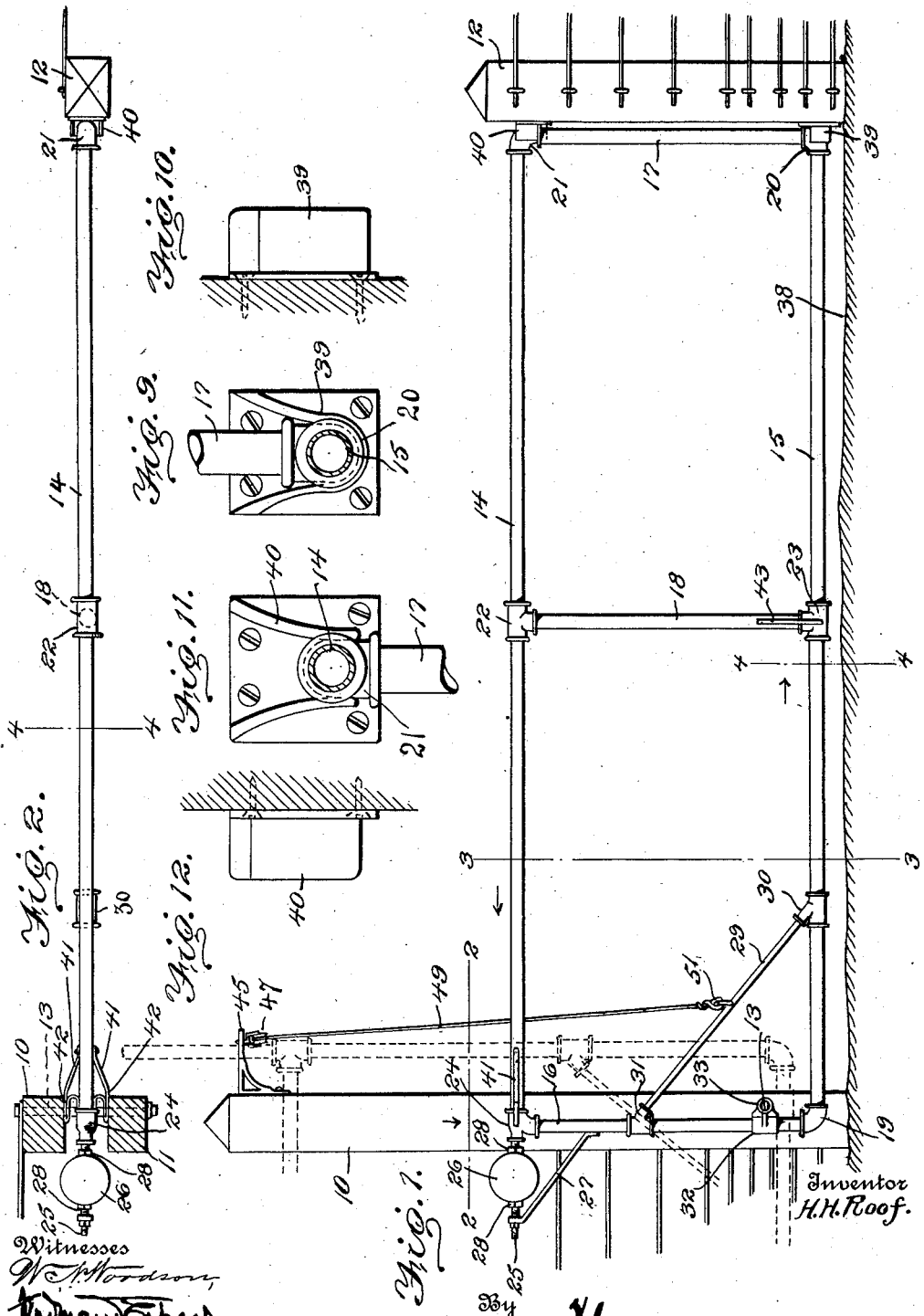
Inventor
H. H. Roof.

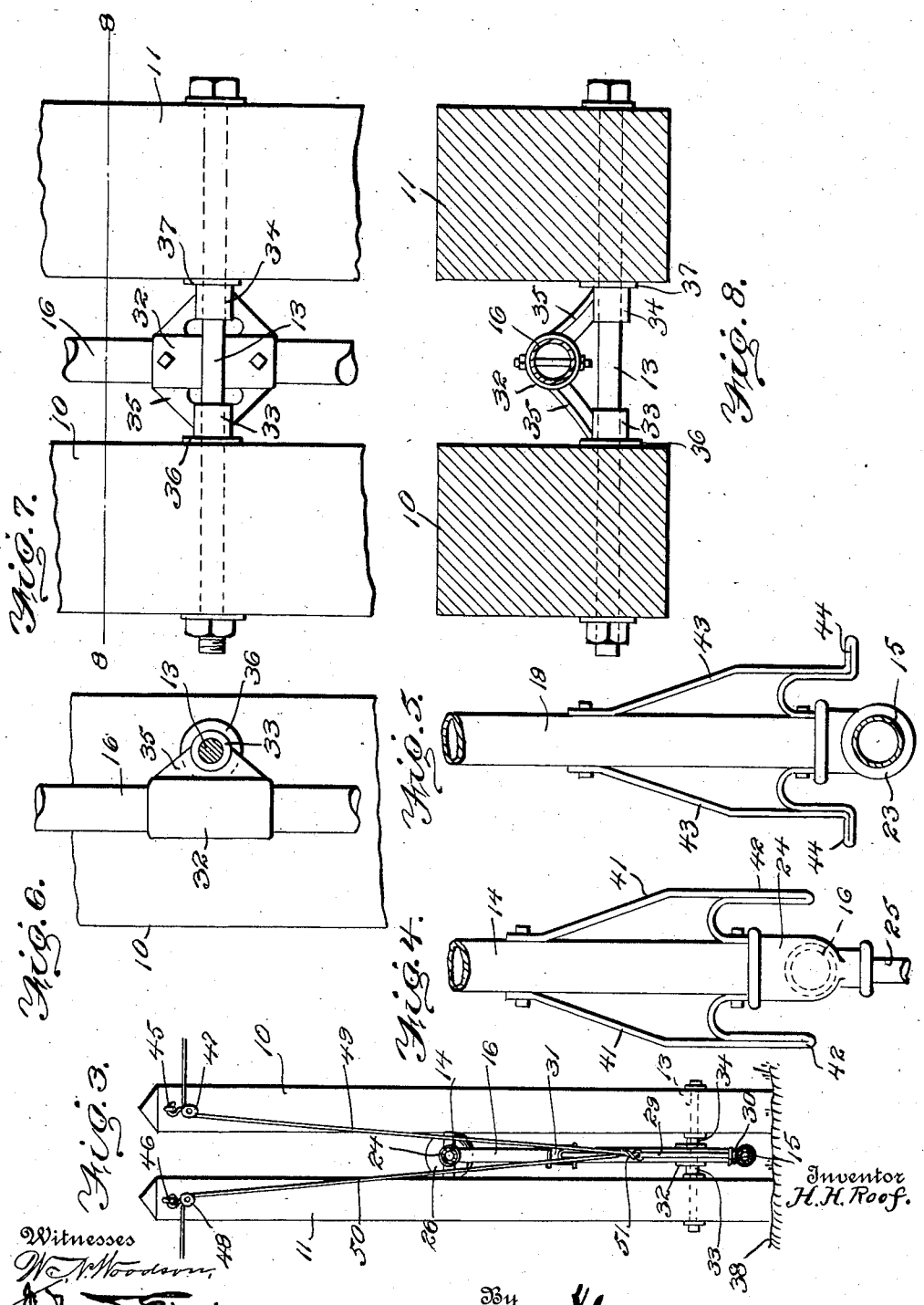

UNITED STATES PATENT OFFICE.

HUGH H. ROOF, OF BILOXI, MISSISSIPPI.

TILTING GATE.

1,062,928.  Specification of Letters Patent.  Patented May 27, 1913.

Application filed March 15, 1912. Serial No. 684,054.

*To all whom it may concern:*

Be it known that I, HUGH H. ROOF, citizen of the United States, residing at Biloxi, in the county of Harrison and State of Mississippi, have invented certain new and useful Improvements in Tilting Gates, of which the following is a specification.

This invention relates to improvements in gates, more particularly of the class of tilting gates which are arranged to swing vertically to open and close, and has for one of its objects to simplify and improve the construction and increase the efficiency and utility of devices of this character.

Another object of the invention is to provide a simply constructed gate of this character which is balanced to decrease the power required to operate the same and provided with suitable guides and rests or supports to maintain the gate in position and prevent lateral swaying or displacement.

With these and other objects in view, the invention consists in certain novel features of construction as hereafter shown and described, and then specifically pointed out in the claims, and in the drawings illustrative of the preferred embodiment of the invention: Figure 1 is a side elevation of the improved gate partly in section; Fig. 2 is a plan view with the twin hinge posts in section on the line 2—2 of Fig. 1; Fig. 3 is a vertical section on the line 3—3 of Fig. 1; Fig. 4 is a plan view enlarged of the "hinge" or swinging end of the gate; Fig. 5 is an enlarged detail in section on the line 4—4 of Fig. 2; Fig. 6 is an enlarged side elevation of the coupling which unites the gate and the main pivot pin; Fig. 7 is an elevation of the member shown in Fig. 5 together with a portion of one of the gate members, and portions of the hinge posts; Fig. 8 is a plan view of the parts shown in Fig. 6 with the posts in section on the line 8—8 of Fig. 7; Fig. 9 is a front elevation of the pocket or receiving member for the lower free end of the gate; Fig. 10 is a side elevation of the member shown in Fig. 9; Fig. 11 is a front elevation of the holding member for the upper free end of the gate; Fig. 12 is a side elevation of the member shown in Fig. 11.

Corresponding and like parts are referred to in the following description and indicated in all the views of the accompanying drawings by the same reference characters.

The improved gate may be employed in connection with fences of various kinds, and it is not desired therefore to limit the invention to fences of any particular class or form.

In the improved gate construction coacting twin posts 10—11 are arranged at the hinge side of the gateway opening and a single post 12 at the "latch" side. The improved gate is designed more particularly for the larger class of farm gates, and the post 12 will be spaced from the twin post 10—11 the usual distance to define the gateway opening, but the improved gate may also be employed in connection with ordinary widths of gates through which pedestrians pass, but for the purpose of illustration the improved gate is shown applied as an ordinary farm gate for the passage of teams.

Extending through the twin posts 10—11 near their lower end, is a pivot bolt or stud 13 upon which the gate is mounted to "tilt." The gate may be constructed of any suitable material, but is preferably formed of a frame of gas or steam piping to support panels of wire fence material, but as the "filling" material of the gate is not a part of the invention, it is not illustrated. The gate frame comprises horizontal upper and lower members 14—15, a hinge end member 16, a latch end member 17, and one or more intermediate brace members 18. The members 15—16 are united by an elbow 19 while a similar elbow 20 unites the members 15—17. The members 14—17 are united by an elbow 21, while the member 18 is united to the members 14—15 by T's 22—23. Another T 24 unites the members 14—16, the latter T having one of its arms smaller than the others to receive a rod 25 which carries a counterweight 26, the rod being supported from the member 16 by a diagonal brace 27. The rod 25 is threaded and provided with a plurality of adjusting nuts 28 so that the weight may be adjusted nearer to or farther from the body of the gate. The gate frame is provided with a diagonal brace 29 united respectively at 30—31 to the members 15—16. Connected to the member 16 at the point where the pivot pin 13 is located, is a coupling member comprising a vertical sleeve 32 through which the member 16 of the gate passes and horizontal sleeves 33—34 mounted for rotation upon the pivot pin 13. The sleeves 32—33—34 are united by a web 35, the sleeves and the web being preferably cast in one piece. At their outer ends the sleeves 33—34 are provided with enlargements or stop collars 36—37 which bear against the inner faces of the posts 10—11, and thus hold the gate in spaced relations to the posts. By this means the gate frame is mounted to swing or tilt between the posts upon the pivot pin.

Connected to the inner face of the "latch" post 12 near the ground, represented at 38, is a receiving member 39 in which the elbow 20 rests when the gate is in closed position. Connected to the inner face of the post 12 near its upper end, is another receiving member 40 in which the elbow member 21 of the gate frame is received when the gate is in closed position. The member 39 is in the form of a pocket closed at the lower end and with a flaring or diverging upper portion, while the member 40 is formed with diverging sides which are disconnected at their lower ends.

Connected to the member 14 near the T 24, are oppositely arranged guide brackets 41, preferably formed from strips of hoop or band metal and including bearing faces 42 which engage against the confronting faces of the posts 10—11 when the gate is closed and thus hold the gate from lateral movement. When the gate is disposed in open position the bracket members 41—42 pass from between the posts rearwardly, and then when the gate is closed the long inclined form of the members 41 insure their passage again between the twin posts.

When the gate is moved into open position, the members 14—15 stand substantially vertical with the member 15 parallel to the twin posts and spaced slightly therefrom, as indicated by dotted lines in Fig. 1, and connected to opposite sides of the brace member 18 near the T 23, are combined guide and stop members each formed from a strip of hoop or band metal 43, and provided at their outer ends with lateral bends 44, the portions 44 extending at right angles to the line of the brace member 18. Each of the members 43 with its extension 44, is so located that when the gate is in open position with the member 15 standing vertically, the projections 44 will engage against the inner faces of the posts 10—11, and thus limit the rearward movement of the gate. The long inclined portions of the members 43 insure the automatic location of the gate frame centrally of the space between the posts 10—11 when the gate is disposed in elevated position, as will be obvious.

Connected to the post 10 is a bracket 45 while a similar bracket 46 is connected to the post 11. Cable sheaves 47—48 are suspended respectively from the brackets 45—46 and provide means for receiving pull cables 49—50, which are coupled at one end at 51 to the diagonal brace 29 intermediate its ends, so that the uniting point of the cable and gate is spaced both inwardly and upwardly from the pivot 13, as shown. By this arrangement it will be noted that the point of union between the cable and the gate is spaced inwardly both from the pivot and above the bottom member so that when strain is applied to the pull cable, the gate will be elevated into vertical position and the point of union between the cable and the brace moved over rearwardly of the line of the pivot, so that when the cable is again pulled the gate will be started upon its return trip. By this means the gate is both opened and closed by pulling upon the cable. This is an important feature of applicant's device and materially increases its efficiency and utility. It will also be noted that by employing the diagonal brace and utilizing the same to carry the pull cable, that when the pull cable is actuated to close the gate, the thrust of the brace is against the end member of the gate, and likewise operates to pull against the bottom member and thus distributes the strains over a large area of the gate frame and prevents the collapse of the latter and likewise prevents any unequal strains being applied to the frame. The diagonal brace likewise effectually supports the frame and prevents the strains applied thereto when the pull cable is actuated, from deflecting the gate or causing it to be thrown out of position. This is also an important feature of applicant's device. The pull cables 49—50 will be conducted to any suitable distance convenient to the hand of a person in an approaching vehicle or on horse back to enable the gate to be opened or closed from a distance, but as the supports for the outer ends of the pull cables do not constitute a part of the present invention, it is not deemed necessary to illustrate these devices.

By this arrangement it will be obvious that by drawing upon either of the pull cables the gate will be caused to tilt upon its pivot 13 into open or closed position, as the case may be, the counterweight 26 assisting in the opening operation and minimizing the power required to open and close the gate. As the gate is moved into closed position, the guide members 41—42 pass between the twin posts 10—11 and thus "center" the gate to cause its latch end to automatically engage with the combined guide and holding members 39—40.

The improved device is simple in construction, can be inexpensively manufactured, is strong and durable, and may be applied to gates of various sizes and constructions.

Having thus described the invention, what is claimed as new is:

1. In a device of the class described, coacting posts spaced apart, a pivot member extending through the posts, a gate including a vertical end member, and a coupling member between the pivot member and the vertical gate member and comprising a sleeve engaging the gate member and sleeves spaced apart and mounted for rotation on the pivot member and bearing against the confronting faces of the posts, said sleeves being united.

2. In a device of the class described, coacting posts spaced apart, a gate including frame members and movable between said posts, a pivot member extending through said posts, means for coupling said gate to said pivot member, and stop members connected to said gate and each including an inclined portion and a lateral projection to guide the gate between the posts and to limit the movement in one direction and to hold the gate from lateral displacement when in open position.

3. In a device of the class described, coacting posts spaced apart, a gate including frame members and movable between said posts, a pivot member extending through said posts, means for coupling said gate to said pivot member, stop members connected to said gate and each including an inclined portion and a lateral projection to guide the gate between the posts and to limit the movement in one direction and to hold the gate from lateral displacement when in open position, a counter-weight support extending from said gate, and a counter-weight carried by said support.

In testimony whereof I affix my signature in presence of two witnesses.

HUGH H. ROOF. [L. S.]

Witnesses:
J. A. HATLESTAD,
S. K. DAY.

---

Copies of this patent may be obtained for five cents each, by addressing the "Commissioner of Patents, Washington, D. C."